(12) United States Patent
Tagawa et al.

(10) Patent No.: US 7,354,637 B2
(45) Date of Patent: Apr. 8, 2008

(54) DAMPER AND PROCESS THEREOF

(75) Inventors: Seiichi Tagawa, Ageo (JP); Mikihito Ogawa, Ageo (JP)

(73) Assignee: Fukoku Co., Ltd., Saitama (JP)

( * ) Notice: Subject to any disclaimer, the term of this patent is extended or adjusted under 35 U.S.C. 154(b) by 327 days.

(21) Appl. No.: 11/155,377

(22) Filed: Jun. 17, 2005

(65) Prior Publication Data

US 2005/0250584 A1    Nov. 10, 2005

Related U.S. Application Data

(62) Division of application No. 09/936,538, filed on Sep. 13, 2001, now Pat. No. 6,984,432.

(30) Foreign Application Priority Data

Nov. 28, 2000  (JP) .............................. 2000-361377

(51) Int. Cl.
    *B32B 3/02* (2006.01)
(52) U.S. Cl. .................... 428/64.1; 428/141; 428/147; 428/148; 428/220; 428/447; 428/544; 428/551; 428/625; 74/574; 188/378; 188/379; 49/9
(58) Field of Classification Search ............... 428/64.1, 428/141, 147, 148, 220, 447, 544, 625; 74/574; 188/378; 49/9
    See application file for complete search history.

(56) References Cited

U.S. PATENT DOCUMENTS 3,893,775 A    7/1975    Sievers et al. ............... 403/225
5,437,937 A    8/1995    Cayless ....................... 428/626
5,789,080 A    8/1998    Grimberg et al. ........... 428/379

FOREIGN PATENT DOCUMENTS

| EP | 0 398 470    | 11/1990 |
| EP | 0 435 781 A2 | 7/1991  |
| JP | 02-085543    | 3/1990  |
| JP | 02085543 A   | 3/1990  |
| JP | 03297637 A   | 12/1991 |
| JP | 05329980 A   | 12/1993 |
| JP | 06015773 A   | 1/1994  |
| JP | 06171009 A   | 6/1994  |
| JP | 06171010 A   | 6/1994  |
| JP | 06171011 A   | 6/1994  |
| JP | 06171012 A   | 6/1994  |
| WO | WO 99/20705  | 4/1999  |

OTHER PUBLICATIONS

EP Search Report for Serial No. EP 00 98 7797 dated May 23, 2005.

*Primary Examiner*—Patrick Joseph Ryan
*Assistant Examiner*—Jane Rhee
(74) *Attorney, Agent, or Firm*—McCormick, Paulding & Huber LLP

(57) ABSTRACT

A fitting type damper and a process thereof being capable of increasing largely slipping torque in strength are ones that the large slipping torque can be increased not only when the damper is a new product but also after a heat aging test and/or a durability test are performed. And, the damper is one that γ-mercaptopropyltrimethoxysilane 4, which is an organosilane used as a non-slip agent, is adhered and fitted between a hub 1 formed by some metal parts and a rubber elastic body 3, and between a inertia mass body 2 formed by some metal parts and the rubber elastic body 3.

4 Claims, 2 Drawing Sheets

DAMPER AND PROCESS THEREOF

This application is a Divisional Application of U.S. Ser. No. 09/936,538 entitled 'Damper and Process Thereof', Seiichi Tagawa, et al., filed on Sep. 13, 2001 now U.S. Pat. No. 6,984,432, and claims the benefit of the filing date thereof under 35 U.S.C. § 120.

TECHNICAL FIELD

The present invention relates to a damper, and in particular to a torsional damper that absorbs twisting vibration generated in a rotation driving system such as a crankshaft of an internal combustion engine.

BACKGROUND ART

As this type damper, the followings have been hitherto suggested: (1) an adhesion type damper wherein a rubber elastic body is vulcanized and adhered between a sleeve and a inertia mass body and a hub is press-fitted inside the sleeve; (2) an adhesion type damper wherein, after an adhesive agent is applied to both surfaces of the a sleeve and a inertia mass body, a vulcanized and molded rubber elastic body is press-fitted between the hub and the inertia mass body; (3) an adhesion type damper obtained by filling non-vulcanized rubber between a hub and a inertia mass body and then vulcanizing and adhering this non-vulcanized rubber; (4) a fitting (non-adhesion) type damper wherein a vulcanized and molded rubber elastic body is press-fitted between a hub and a inertia mass body; and so on.

In a fitting type damper, a polymer elastic body for connecting a hub and a inertia mass body to each other is generally fitted in a compressed state. Therefore, the fitting type damper is known in that a process thereof is simpler and the durability thereof is higher than an adhesion type damper. On the other hand, when high load is applied to the fitting type damper, slipping in a rotary direction is often caused between the hub formed by metal parts and the rubber elastic body or between their inertia mass body formed by metal parts and the rubber elastic body.

Recently, therefore, for the fitting type damper the followings have been suggested to prevent this slip and to increase (improve) slipping torque; (5) a method of subjecting a fitting surface of a hub or a inertia mass body to shot blast treatment; (6) a method of giving adhesiveness to a rubber elastic body itself; (7) and a method of interposing polymethylene polyphenyl polyisocyanate on an interface between a hub and a rubber elastic body or between a inertia mass body and a rubber elastic body.

As a damper for realizing high durability and high slipping torque, there is a damper which is a fitting and adhesive type. The process of this damper comprises: a first step of applying an adhesive agent to respective surfaces of a hub and/or a inertia mass body so as to face a rubber; a second step of drying the applied adhesive agent; a third step of applying press-fitting liquid such as oil onto the dried adhesive agent; a fourth step of press-fitting a another vulcanized rubber between the hub and the inertia mass body; a fifth step of removing an excess amount of press-fitting liquid; and a sixth step of heating the assembled damper to adhere the hub and/or the inertia mass body to the another rubber.

Japanese Patent Laid-open No. 2-85543 discloses a structure in which a inertia mass body and a rubber elastic body are jointed with a silane type adhesive agent to improve heat resistance of the rubber elastic body for use of a dynamic damper. In Examples thereof, as examples of the rubber elastic body having heat resistance, an ethylene acrylic rubber and acrylonitril rubber are described, and as an example of the silane type adhesive agent, Y-4310 (which is trade name and is made by Lord Corporation) is described.

About a conventional fitting type damper subjected to shot blast treatment, the process thereof is simple but high slipping torque cannot be obtained.

About the conventional fitting type damper which has adhesiveness on surfaces of the rubber elastic body thereof, durability thereof is reduced and the process thereof is complicated. Moreover, press-fitting of conventional fitting type damper is difficult.

About the conventional fitting type damper in which polymethylene polyphenyl polyisocyanate is interposed, the following steps are necessary to make fitting easy: an applying step of applying press-fitting oil to a fitting surface of a hub or a inertia mass body and a washing step of removing this press-fitting oil after being fitted. Therefore, number of the process steps increases. Since the conventional fitting type damper has toxicity, problems about safety thereof arise, so that cost of manufacturing the damper rises.

About the conventional post-adhesion type damper obtained by applying an adhesive agent to a hub and a massive body and by press-fitting another vulcanized and molded rubber after carrying out heating and adhesion, the step of applying and drying the adhesive agent and the washing step of removing press-fitting oil are necessary. Therefore, number of the process steps increases. When the another rubber is press-fitted, by friction between a surface of the another rubber and an adhesive agent layer formed on a surface of metal fittings for fixing the another rubber, the adhesive agent layer may be partially sliced off, so that adhesion unevenness is easily caused.

Accordingly, the conventional fitting type dampers have above-mentioned various drawbacks.

An object of the present invention is to provide a fitting type damper making it possible to increase slipping torque highly, and in particular a fitting type damper capable of having a large slipping torque not only when the damper is new but also after both a heat aging test and a durability test are performed, and to provide a process of the fitting type damper.

DISCLOSURE OF THE INVENTION

The inventor has found that by selecting an organosilane as a non-slip agent provided between a hub formed by metal parts and a polymer elastic body, and/or a massive body formed by metal parts and the polymer elastic body, Solution of the organosilane can be used as press-fitting liquid when the polymer elastic body is press-fitted between the hub and the inertia mass body, and the organosilane can be used in common for the non-slip agent and the press-fitting liquid.

Moreover, during investigation of detailed mechanism thereof, the inventor has found that according to the present invention, a surface of the hub or the inertia mass body, the surface facing and being provided with the polymer elastic body, has sufficient adhesive power to be obtained without providing a coat for improving rust prevention and/or adhesiveness, such as a metal plating layer or chromate treatment, that is, without performing any chemical surface treatment.

Regarding a surface facing and being providing with the polymer elastic body in the hub or the inertia mass body, and a surface facing and being providing with the hub or the inertia mass body in the polymer elastic body, reactive groups existing between the one metal surface of the polymer elastic body and the organosilane on the surface of the polymer elastic body easily react with the organosilane, so that chemical adhesive mechanism is created and thereby adhesive power therebetween is obtained. On the other hand, as there is no chemical surface treatment between the other metal surface of the hub and the inertia mass body and the organosilane, the other metal surface being without performing chemical surface treatment easily generates rust or the like thereon, so that it is difficult to cause stable chemical surface treatment and thereby to obtain sufficient adhesive power. It is however presumed that sufficient physical adhesive mechanism to compensate for the chemical adhesive mechanism is formed between the above-mentioned metal surface and the organosilane and thereby sufficient adhesive power is caused.

It can be considered that from a microscopic viewpoint, a great deal of unevenness is generated in the metal surface subjected to no chemical surface treatment. It can be considered that since the organosilane contacts and adheres to the unevenness, the adhering organosilane and the unevenness of the metal surface are in the state that both are fitted to each other and, that is, this fitting power for fitting both to each other acts as physical adhesive power.

Thus, in this physical adhesive mechanism, the adhesive power becomes larger as the surface roughness of the metal surface becomes larger. However, if the surface roughness becomes too large, the polymer elastic body can not adapt the unevenness of the metal surface. Therefore, the organosilane put between the polymer elastic body and the metal surface becomes very uneven in thickness, so that an effective area for being capable of generating effective adhesive power is reduced. Thus, the adhesive power drops. To increase the adhesive power in strength, the surface roughness of the metal surface is performed by machining or the like. If the surface roughness is within a range of 5 to 50 μmRz (JIS B0601) at ten-points average roughness, stable and strong adhesive power thereof can be obtained, so that the range is particular preferable.

In other words, if the surface roughness is below 5 μmRz, sufficient physical adhesive mechanism to compensate for the chemical adhesive mechanism cannot be generated. If the roughness is over 50 μmRz, the effective area of the metal surface decreases, so that the adhesive power is reduced.

The above-mentioned chemical surface treatment means plating treatment for depositing another layer on a surface or forming treatment for controlling surface activity, or the like.

In the damper of the present invention, since the organosilane is put between the polymer elastic body and the metal surface, the physical adhesive mechanism is formed therebetween as described above. When the damper is used, even if high torque is irregularly applied to the damper to cause a slip between the polymer elastic body and the metal surface, function of the physical adhesive mechanism can be restored to some degree in comparison with a bond between the polymer elastic body and the metal surface. Therefore, there is a low possibility that all the functions of the physical adhesive mechanism are lost at once by input of excessive torque. It is considered that this is because even if the uneven surface in the fitted state is somewhat slid, the uneven surface is fitted to the organosilane again, to some extent, at the slid position.

The present invention is a damper being a fitting type including a hub, a inertia mass body, and a polymer elastic body such a rubber press-fitted between the hub and the inertia mass body from an axis direction thereof, characterized in that an organosilane as a non-slip agent is provided at least one of between said hub formed by a metal member and said polymer elastic body and between said inertia mass body formed by a metal member and said polymer elastic body.

At least one of a metal surface adhering the polymer elastic body in said hub and a metal surface adhering to the polymer elastic body in said inertia mass body is without performing chemical surface treatment. Surface roughness in at least of one of a metal surface adhering to the polymer elastic body in said hub and a metal surface adhering to the polymer elastic body in said inertia mass body is within a range of 5 to 50 μmRz (JIS B0601).

The present invention is a process of a damper being a fitting type including a hub, a inertia mass body, and a polymer elastic body such a rubber press-fitted between the hub and the inertia mass body from an axis direction thereof, the process comprising: a first step of applying an organosilane solution as a non-slip agent onto at least one of both surfaces of said hub and said inertia mass body, both surfaces facing the polymer elastic body; a second step of press-fitting the polymer elastic body applied onto the organosilane solution between the hub and the inertia mass body; and a third step of heating the damper to remove a solvent thereof, reacting the organosilane in the surface of said polymer elastic body and at least one of both surface of said hub and said inertia mass body, and attaching and fitting said hub and said inertia mass body.

The present invention is a process of a damper being a fitting type including a hub, a inertia mass body, and a polymer elastic body such a rubber press-fitted between the hub and the inertia mass body from an axis direction thereof, the process comprising: a first step of applying an organosilane solution as a non-slip agent onto at least one of both surfaces of said hub and said inertia mass body, said both surfaces being faced by respective surfaces of said polymer elastic body; a second step of press-fitting said polymer elastic body between said hub and said inertia mass body after said first step; and a third step of heating the damper to remove a solvent thereof, reacting the organosilane in the surface of said polymer elastic body and at least one of both surface of said hub and said inertia mass body, and attaching and fitting said hub and said inertia mass body.

In either of the above-mentioned processes of a damper, at least one of both surfaces of said hub and said inertia mass body being attached and fitted to said organosilane, said both surfaces facing said polymer elastic body is without performing heat surface treatment. Surface roughness in at least of one of a metal surface adhering to the polymer elastic body in said hub and a metal surface adhering to the polymer elastic body in said inertia mass body is within a range of 5 to 50 μmRz (JIS B0601).

BEST MODE FOR CARRYING OUT THE INVENTION

Figure 1:
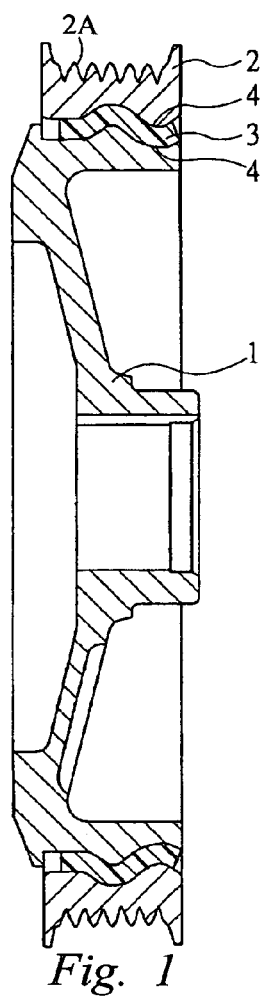
FIG. 1 is a cross section showing an embodiment of a fitting type damper according to the present invention.

FIG. 1 is a cross section showing an embodiment of a fitting type damper according to the present invention.

Figure 2:
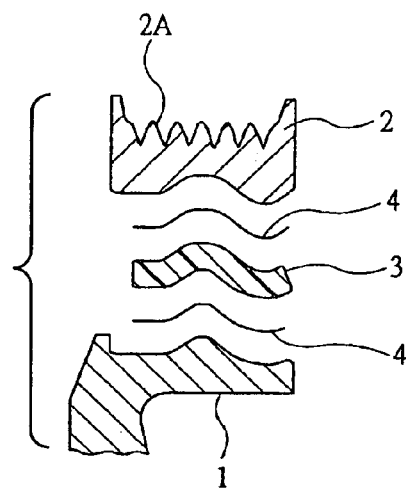
FIG. 2 is a partially cross section of the damper shown in FIG. 1.

FIG. 2 is a partially cross section of the damper shown in FIG. 1. In these drawings, reference number 1 denotes a hub. This hub 1 is made of a given metal and has a ring form. The hub 1 is attached to an outer periphery of an end of a crankshaft (not shown) in an internal combustion engine such as an automobile engine or the like. A metal surface of the outer periphery of the hub 1 is subjected to no chemical surface treatment such as plating treatment.

Reference number 2 denotes a inertia mass body, and this inertia mass body 2 is made of a given metal and has a ring form. The inertia mass body 2 is arranged at an outer peripheral side of the hub 1 and concentrically with the hub 1 and is spaced from the hub 1. A metal surface of an inner periphery of the inertia mass body 2 is not subjected to chemical surface treatment such as plating treatment or the like, either.

Reference number 3 denotes a rubber elastic body formed in a ring shape. This rubber elastic body 3 is press-fitted between the hub 1 and the inertia mass body 2 through a silane compound described below. This rubber elastic body 3 has a predetermined press-fitting margin. However, when high load is applied to the rubber elastic body 3, the rubber elastic body 3 causes a slip in a rotary direction thereof, and the slip can not be prevented only by this press-fitting margin.

Reference number 4 denotes, for example, γ-mercaptopropyltrimethoxysilane as an organosilane. This γ-mercaptopropyltrimethoxysilane 4 adheres to respective interfaces between the hub 1 and the rubber elastic body 3, and between the rubber elastic body 3 and the inertia mass body 2.

A pulley groove 2A is provided at an outer peripheral side of the inertia mass body 2 to transmit rotary torque to various types of auxiliary devices (not shown).

In the fitting type damper having the above-mentioned structure, γ-mercaptopropyltrimethoxysilane 4, which is an organosilane as a non-slip agent, is provided between the hub 1 formed by some metal parts and the rubber elastic body 3, and between the inertia mass body 2 formed by some metal parts and the rubber elastic body 3, so that slipping torque (limiting torque so that a slip is caused) can be largely increased.

The following will describe a process for producing the fitting type damper having the above-mentioned structure.

First, γ-mercaptopropyltrimethoxysilane 4, which is an organosilane as a non-slip agent, is dissolved into a solvent such as toluene to prepare a γ-mercaptopropyltrimethoxysilane solution.

This γ-mercaptopropyltrimethoxysilane solution is applied onto both surfaces of the rubber elastic body 3. This rubber elastic body 3 onto which the γ-mercaptopropyltrimethoxysilane solution is applied is press-fitted between the hub 1 and the inertia mass body 2.

The damper comprising the hub 1, the inertia mass body 2, and the rubber elastic body 3 onto which the γ-mercaptopropyltrimethoxysilane solution is applied and press-fitted therebetween, is put into a thermostat, and is then heated, for example, at 120° C. for 3 hours.

Since toluene, which is the solvent of the γ-mercaptopropyltrimethoxysilane solution, is emitted and removed, γ-mercaptopropyltrimethoxysilane adheres to the hub 1 and the inertia mass body 2 by heating reaction and thereby the hub 1 and the inertia mass body 2 are liked to each other.

To check an effect of the fitting type damper having the above-mentioned structure, evaluation tests were carried out. Each of fitting type dampers subjected to the tests has a shape as shown in FIG. 1 and an outer diameter of 163 mm.

Table 1 shows Comparative examples 1-6 corresponding to non-slip agent and Example about a non-slip agent.

TABLE 1

| | Non-slip agent | Physical surface treatment |
|---|---|---|
| Comparative Example 1 | None | None (20 μmRz) |
| 2 | None | Shot blast |
| 3 | Phenol type | None (20 μmRz) |
| 4 | Isocyanate type | None (20 μmRz) |
| 5 | Pyridine type latex | None (20 μmRz) |
| 6 | Chlorine type treating agent | None (20 μmRz) |
| Example | γ-mercaptopropyltrimethoxysilane | None (20 μmRz) |

Table 2 shows Comparative examples 1-6 and Example about Slipping torque (n·m).

TABLE 2

[Slipping Torque (N · m) between rubber and metal]

| | | Sample | | | | |
|---|---|---|---|---|---|---|
| Measurement | | New product | | After 200 hours at 120° C. | | After the durability test |
| Conditions | | RT | 100° C. | RT | 100° C. | RT |
| Comparative example | 1 | 370 | 280 | 270 | 240 | 320 |
| | 2 | 420 | 290 | 300 | 250 | 330 |
| | 3 | 500 | 350 | 410 | 310 | 430 |
| | 4 | 430 | 290 | 320 | 260 | 360 |
| | 5 | 420 | 290 | 310 | 250 | 340 |
| | 6 | 490 | 330 | 400 | 290 | 410 |
| Example | | 1060 | 820 | 980 | 710 | 1060 |

Durability conditions: performance of 20 Hz and 1,500,000 times (at rubber temperature of 100° C.) under rubber strain of 50%, thereafter measurement of slipping torque.

Table 3 shows Comparative examples 1 and 2 and Example about loads required at the press-fitting.

TABLE 3

| | Press-fitting oil | Load required at the press-fitting |
|---|---|---|
| Comparative example 1 | None | Press-fitting impossiblity |
| Comparative example 2 | Used | 2.3 tf |
| Example | None | 2.7 tf |

As shown in measured results of Table 2, the γ-mercaptopropyltrimethoxysilane 4, which is an organosilane as a non-slip agent, is provided between the hub formed by some metal parts and the rubber elastic body, and between the inertia mass body formed by some metal parts and the rubber elastic body. So, it is verified that slipping torque of respective new products can be largely increased, and heat resistance thereof is improved. It is also verified that the slipping torque can be kept large without decreasing even after a heat aging test and a durability test are performed.

Next, relationship between slipping torque and surface roughness of respective metal surfaces of both the hub 1 and the inertia mass body 2 formed by some metal parts of the damper having the above-mentioned structure, was examined.

A pulley 2B(2) which is a inertia mass body 2 used as a metal member of the damper examined in the test is manufactured by: using gray cast iron FC250 material to be cast into a rough shape; cutting and treating some metal surfaces or the like for adhering to the pulley groove 2A and a polymer elastic body to form a desired shape; and making the metal surface of the polymer elastic body an inside diameter of 128 mm and a height of 25 mm. In the present application, the term of "a polymer elastic body" includes a rubber elastic body and a plastic elastomer body (an elastomer body). In a similar way, the hub 1 is manufactured by: using the FC250 material to be cast into a rough shape; cutting and treating some metal surfaces or the like for adhering to a boss portion and the polymer elastic body to form a desired shape; and making the metal surface of the polymer elastic body an outside diameter of 122 mm and a height of 25 mm. The respective metal surfaces of the pulley 2B and the hub 1 adhering to the polymer elastic body were adjusted by cutting speed thereof to have surface roughness of 5, 10, 15, 28, 40 and 50 μmRz (JIS B0601). Thus, six kinds of test metal parts were prepared.

The polymer elastic body provided in the pulley 2B and the hub 1 is manufactured by vulcanizing an EPDM material with a peroxide to produce a rubber ring 3A formed in a ring shape and having a rubber hardness of 65° Hs (JIS K6253 type A durometer), as the rubber elastic body 3.

The hub 1 and the six-kind pulleys 2B manufactured by the above-mentioned process were degreased, washed, and dried. A press-fitting tool was used between the pulley 2B and the hub 1 to press-fit the rubber ring 3A(3) dipping-coated with the γ-mercaptopropyltrimethoxysilane solution at a compression ratio of 40% and provided with the ring therebetween. At this time, the rubber ring 3A was used under the same condition (as that of six-kind Examples). Next, by being heated at 120° C. for 3 hours in the thermostat, and then naturally cooled, the test dampers as Examples of the present invention are formed.

As Comparative Example, the respective metal surfaces of the pulley 2B and the hub 1, the metal surface adhering to the polymer elastic body and having a surface roughness of 20 μmRz (JIS B0601), were degreased, washed and then dried. The pulley 2B and the hub 1 were manufactured in the same way as that of the Examples of the present invention. A press-fitting tool was used between the pulley 2B and the hub 1 to press-fit the rubber ring 3A dipping-coated with a press-fitting oil and assemble the ring therebetween. At this time, the rubber ring 3A was used under the same condition as that of the Example. Next, by being heated at 120° C. for 3 hours in a thermostat and then naturally cooled, the test damper is formed.

Figure 3:
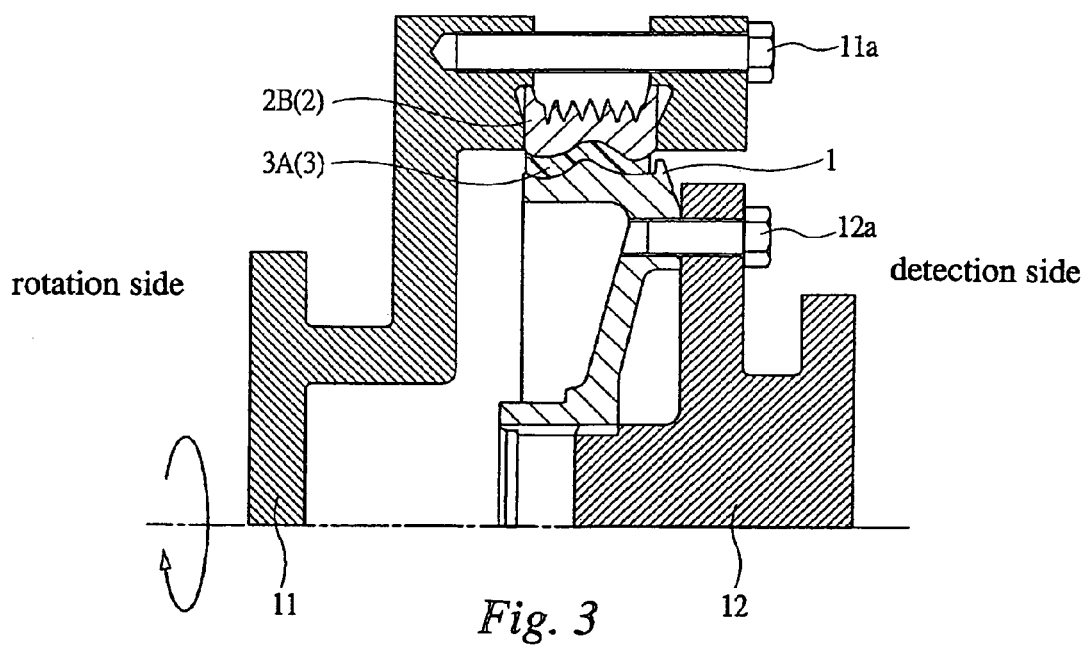
FIG. 3 is an explanatory sectional view showing a slipping torque test tool and a test damper.

In the test as shown in FIG. 3, each of the test damper was fixed on a test tooling, and then the test tool was set into an not shown test device to measure the slipping torque in the rotary direction of the damper. At room temperature (RT), a side portion of the pulley 2B of the test damper manufactured by the above-mentioned process was fixed to a rotating-side fixing member 11 of the test tool by holding the side portion of the pulley 2B with a bolt 11a in such a manner that the side portion of the pulley was not slid. The hub 1 was fixed to a detecting-side fixing member 12 by fastening a bolt 12a into a screw hole provided in the hub 1. FIG. 3 is a sectional view showing an upper half above central line of both the test tool and the test damper.

The rotating-side fixing member 11 was fixed to an not shown driving device for giving rotary power in the test device, and the detecting-side fixing member 12 was fixed to an not shown load cell for detecting slipping torque in the test device. The rotating-side fixing member 11 was rotated at a rotary speed of $1.4 \times 10^{-2}$ rad/sec along a rotary axis of the test damper. And, the detecting load cell fixed to the detecting-side fixing member 12 measured a value of maximum torque during the time when a slip was caused between the pulley 2B, the hub 1, and the rubber ring 3A. Measured results are shown in Table 4 and a graph of FIG. 4. In the drawing, a circle, ○, indicates Examples and a triangle, Δ, indicates Comparative Example as corresponding to Table 4.

TABLE 4

| Surface roughness (μmRz) | Slipping torque (N · m) | |
|---|---|---|
| | Example | Comparative Example |
| 5 | 796 | 400 |
| 10 | 933 | |
| 15 | 1029 | |
| 20 | 1029 | |
| 28 | 1029 | |
| 40 | 1029 | |
| 50 | 960 | |

Figure 4:
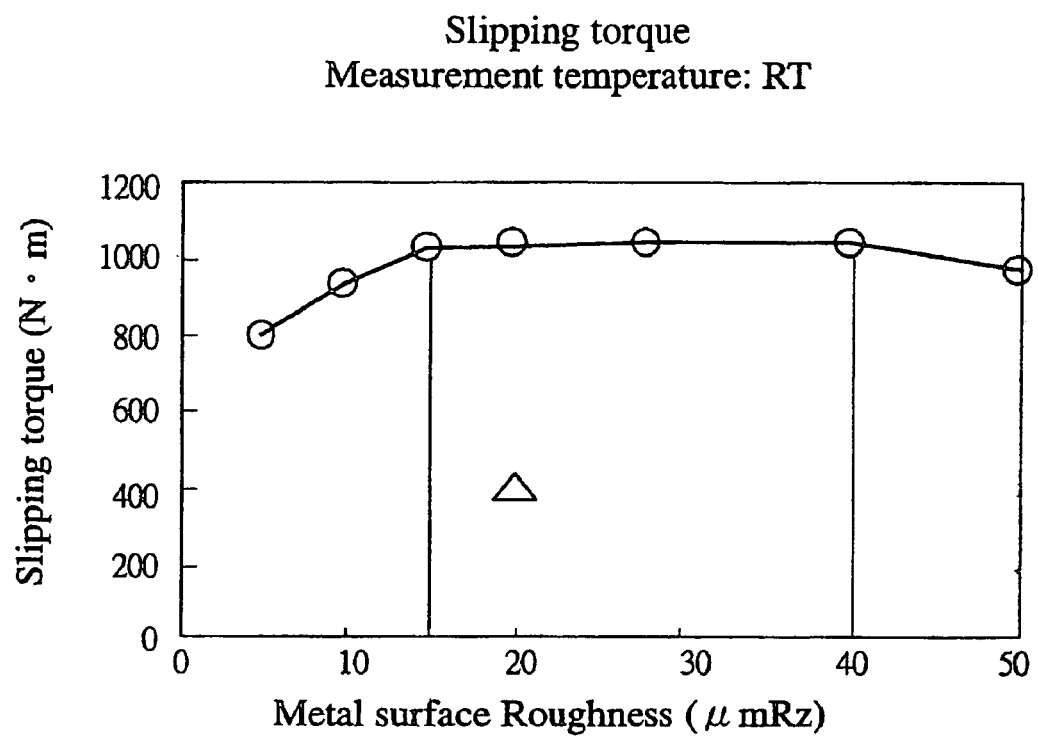
FIG. 4 is a graph showing relationship between metal surface roughnesses and slipping torque.

It can be understood from the graph shown in FIG. 4 that as the metal surface roughness becomes rougher, such as 5 μm, 10 μm and 15 μm, strength of the slipping torque becomes larger such as 800 N·m, 933 N·m and 1029 N·m. However, it can be understood that the strength of the slipping torque levels off such as 1029 N·m, 1029 N·m, and 1029 N·m even when the metal surface roughness becomes far larger such as 20 μm, 28 μm and 40 μm, and the strength of the slipping torque starts to decrease when the surface roughness becomes larger than 40 μm. FIG. 4 shows slipping torque of 960 N·m in strength at surface roughness of 50 μm.

In Comparative example, FIG. 4 shows slipping torque of 400 N·m at a surface roughness of 20 μm.

That is, as is evident from FIG. 4, the damper of the present invention had slipping torque about twice more than that of Comparative Example, and thereby it can be understood that the damper of Example is better than the press-fitting type of the prior art. The damper of this present invention Example was formed by making the metal surface adhering to the polymer elastic body, surface roughness of 5 to 50 μmRz (JIS B0601) without performing chemical surface treatment on the metal surface which adheres to the polymer elastic body and contacts to the organosilane. It can also be understood that high slipping torque is stably exhibited in the range of surface roughnesses of 15 to 40 μm.

The above-mentioned Examples describe the case where the solution of γ-mercaptopropyltrimethoxysilane 4, which was an organosilane, was applied onto both surfaces of the rubber elastic body 3. The invention is not however limited thereto. It goes without saying that the solution of γ-mercaptopropyltrimethoxysilane 4, which was an organosilane, was applied onto the outer peripheral surface of the ring-form hub 1 and the inner peripheral surface of the ring-form inertia mass body 2.

The above-mentioned Examples also describe the case where the solution of γ-mercaptopropyltrimethoxysilane 4 was applied onto both surfaces of the rubber elastic body 3 and the case where the solution of γ-ercaptopropyltrimethoxysilane 4 was applied onto both the outer peripheral surface of the ring-form hub 1 and the inner peripheral surface of the ring-form inertia mass body 2. The present invention is not however limited thereto. It goes without saying that γ-mercaptopropyltrimethoxysilane 4 is applied.

The above description is about the structure in which the rubber elastic body 3 used as a polymer elastic body was adhered to both the hub 1 and the inertia mass body 2 with the organosilane, but adhesion to the organosilane may be carried out either between the rubber elastic body 3 and the hub 1, or between the rubber elastic body 3 and the inertia mass body 2.

As this organosilane, γ-mercaptopropyltrimethoxysilane was used, but the organosilane is not limited thereto. It goes without saying that the followings are used: (a) vinyltris(β methoxyethoxy)silane, (b) vinyltriethoxysilane, (c) vinyltrimethoxysilane, (d) γ-(methacryloxypropyl)trimethoxysilane, (e) β-(3,4 epoxycyclohexyl)ethyltrimethoxysilane, (f) γ-glycidoxypropylmethyldiethoxysilane, (g) γ-glycidoxypropylmethyldiethoxysilane, (h) N-β (aminoethyl) γ-aminopropyltrimethoxysilane, (i) N-β (aminoethyl) γ-aminopropylmethyldimethoxysilane, (j) γ-aminopropyltriethoxysilane, (k) N-phenyl-γ-aminopropyltrimethoxysilane, (l) vinyltrichlorosilane, (m) γ-chloropropyltrimethoxysilane or the like.

As the polymer elastic body, the rubber elastic body was used, but it goes without saying that the polymer elastic body is not limited thereto.

INDUSTRIAL APPLICABILITY

As described above in detail, the present invention is suitable for using dampers and a process thereof. The damper of the present invention is a damper being a fitting type including a hub, a inertia mass body, and a polymer elastic body such a rubber press-fitted between the hub and the inertia mass body from an axis direction thereof, wherein an organosilane used as a non-slip agent is interposed between said hub formed by a metal member and said polymer elastic body and/or between said inertia mass body formed by a metal member and said polymer elastic body. Therefore, the damper has high adhesive power and high durability.

Since at least one of an opponent surface facing the polymer elastic body in the hub and an opponent surface facing the polymer elastic body in the inertia mass body is without performing chemical surface treatment, the process of the damper can be simplified and cost of manufacturing the damper can be reduced.

By setting surface roughness of an opponent surface facing the polymer elastic body in the hub and/or an opponent surface facing the polymer elastic body in the inertia mass body within a range of 5 to 50 μmRz, the adhesive power of the damper can be strengthened.

In damper and process thereof according to the present invention, when the polymer elastic body is press-fitted into a gap between the hub and the inertia mass body, an organosilane solution is used as a press-fitting liquid. Therefore, the organosilane can be certainly interposed between the hub and the polymer elastic body and/or between the inertia mass body and the polymer elastic body. And, the organosilane is heated to be functioned as a non-slip agent, so that the damper can obtain certain adhesive power.

In addition, the process of the damper does not require: a step of applying opponent surfaces facing between the hub and the polymer elastic body and/or opponent surfaces facing between the inertia mass body and the polymer elastic body, onto the non-slip agent to form a bonding layer; and a step of shaving off the bonding layer performed due to friction which the opponent surfaces facing between the polymer elastic body and the hub and/or the opponent surfaces facing between the inertia mass body and the polymer elastic body are rubbed against each other, when the polymer elastic body is press-fitted. Therefore, the press has such effect that the hub and the inertia mass body can be certainly attached and fitted to each other, and thereby the damper can be manufactured simply and at reasonable prices.

What is claimed is:

1. A process of forming a damper, the damper being a fitting type including a hub, an inertial mass body, and a polymer elastic body press-fitted between the hub and the inertia mass body from an axis direction thereof, wherein a surface roughness in at least one of a metal surface adhering to the polymer elastic body in the hub and a metal surface adhering to the polymer elastic surface in the inertia mass body is within a range of 15 to 50 μmRz, the process comprising:
    a first step of applying an organosilane solution as a non-slip agent onto at least one of both surfaces of said hub and said inertia mass body, both surfaces facing the polymer elastic body;
    a second step of press-fitting the polymer elastic body applied onto the organosilane solution between the hub and the inertia mass body; and
    a third step of heating the damper to remove a solvent thereof, reacting the organosilane in the surface of said polymer elastic body and at least one of both surfaces of said hub and said inertia mass body, and attaching and fitting said hub and said inertia mass body.

2. A process of forming a damper, the damper being a fitting type including a hub, an inertial mass body, and a polymer elastic body press-fitted between the hub and the inertia mass body from an axis direction thereof, wherein a surface roughness in at least one of a metal surface adhering to the polymer elastic body in the hub and a metal surface adhering to the polymer elastic surface in the inertia mass body is within a range of 15 to 50 μmRz, the process comprising:
    a first step of applying an organosilane solution as a non-slip agent onto at least one of both surfaces of said hub and said inertia mass body, said both surfaces being faced by respective surfaces of said polymer elastic body;
    a second step of press-fitting said polymer elastic body between said hub and said inertia mass body after said first step; and
    a third step of heating the damper to remove a solvent thereof, reacting the organosilane in the surface of said polymer elastic body and at least one of both surfaces of said hub and said inertia mass body, and attaching and fitting said hub and said inertia mass body.

3. The process of a damper according to claim 1, wherein at least one of both surfaces of said hub and said inertia mass body being attached and fitted to said organosilane, said both surfaces facing said polymer elastic body is without performing chemical surface treatment.

4. The process of a damper according to claim 2, wherein at least one of both surfaces of said hub and said inertia mass body being attached and fitted to said organosilane, said both surfaces facing said polymer elastic body is without performing chemical surface treatment.

* * * * *